(12) United States Patent
Arkan et al.

(10) Patent No.: US 10,065,621 B2
(45) Date of Patent: Sep. 4, 2018

(54) INTERNAL VENTILATING DIAPHRAGM—DIAPHRAGM SPRING BRAKE ACTUATOR

(71) Applicant: ARFESAN ARKAN FREN ELEMANLARI SANAYI VE TICARET A.S., Kocaeli (TR)

(72) Inventors: Fuat Burtan Arkan, Kocaeli (TR); Yavuz Battal, Kocaeli (TR); Omer Faruk Kulac, Kocaeli (TR)

(73) Assignee: ARFESAN ARKAN FREN ELEMANLARI SANAYI VE TICARET A.S., Kocaeli (TR)

( * ) Notice: Subject to any disclaimer, the term of this patent is extended or adjusted under 35 U.S.C. 154(b) by 138 days.

(21) Appl. No.: 15/116,512

(22) PCT Filed: Aug. 26, 2014

(86) PCT No.: PCT/TR2014/000322
§ 371 (c)(1),
(2) Date: Aug. 4, 2016

(87) PCT Pub. No.: WO2015/122860
PCT Pub. Date: Aug. 20, 2015

(65) Prior Publication Data
US 2016/0339895 A1    Nov. 24, 2016

(30) Foreign Application Priority Data
Feb. 14, 2014    (TR) .............................. a 2014 01720

(51) Int. Cl.
*B60T 17/08*    (2006.01)
*F16D 65/28*    (2006.01)
*F16D 121/10*    (2012.01)
*F16D 125/12*    (2012.01)

(52) U.S. Cl.
CPC ............ *B60T 17/083* (2013.01); *F16D 65/28* (2013.01); *F16D 2121/10* (2013.01); *F16D 2125/12* (2013.01)

(58) Field of Classification Search
CPC .. F16D 65/28; F16D 2125/12; F16D 2121/10; B60T 17/083
See application file for complete search history.

(56) References Cited

U.S. PATENT DOCUMENTS 3,548,720 A * 12/1970 Wearden ............... B60T 17/086
                                                          92/130 A
3,736,842 A *  6/1973 Valentine .............. B60T 13/261
                                                          303/71
3,800,668 A *  4/1974 Valentine .............. B60T 17/083
                                                          91/399

(Continued)

FOREIGN PATENT DOCUMENTS

CN        202100636 U     1/2012
DE        10228934 A1     1/2004

(Continued)

*Primary Examiner* — F. Daniel Lopez
*Assistant Examiner* — Matthew Wiblin
(74) *Attorney, Agent, or Firm* — Gokalp Bayramoglu

(57) ABSTRACT

This invention is related to a diaphragm-diaphragm spring brake actuator with internal ventilation designed to decrease the actuator breakdowns used in the air brake system of heavy vehicles such as trucks lorries, trailers and busses.

4 Claims, 5 Drawing Sheets

(56) References Cited

U.S. PATENT DOCUMENTS

| | | | | |
|---|---|---|---|---|
| 5,025,709 | A | * | 6/1991 | Miyazaki .............. B60T 13/563 |
| | | | | 403/13 |
| 5,722,311 | A | * | 3/1998 | Pierce ................... B60T 17/083 |
| | | | | 92/130 A |
| 6,029,447 | A | | 2/2000 | Stojic et al. |
| 6,360,649 | B1 | * | 3/2002 | Plantan ................ B60T 17/083 |
| | | | | 92/99 |
| 6,405,635 | B1 | * | 6/2002 | Smith ..................... B60T 17/08 |
| | | | | 92/98 R |
| 7,121,191 | B1 | * | 10/2006 | Fisher .................. B60T 17/083 |
| | | | | 92/63 |
| 8,196,718 | B2 | * | 6/2012 | Savagner ............. B60T 17/083 |
| | | | | 188/153 D |
| 2013/0075212 | A1 | * | 3/2013 | Darner ................. B60T 17/002 |
| | | | | 188/70 R |

FOREIGN PATENT DOCUMENTS

| | | |
|---|---|---|
| DE | 102009019569 A1 | 11/2010 |
| GB | 1237641 A | 6/1971 |
| WO | WO2012164587 A2 | 12/2012 |

* cited by examiner

INTERNAL VENTILATING DIAPHRAGM—DIAPHRAGM SPRING BRAKE ACTUATOR

TECHNICAL FIELD OF THE INVENTION

This invention is related to a diaphragm-diaphragm spring brake actuator with internal ventilation designed to decrease the breakdowns in actuators used in the air brake system of heavy vehicles such as trucks, trailers lorries and busses.

BACKGROUND

The spring brake actuators are divided into two groups; one of which is the diaphragm-diaphragm spring brake actuator and the other is the diaphragm-piston spring brake actuator. The spring brake actuator with internal ventilation subject to the invention is related to the diaphragm-diaphragm type spring brake actuator.

The spring brake actuator is used in pressurized air brake systems present in the heavy commercial vehicles such as trucks, trailers, lorries and busses and said actuator converts the energy stored in the emergency spring into the energy that actuates the brake.

The spring brake actuators comprise an emergency chamber, which is used in the case—there is an air leakage or air is discharged (hand brake is pulled); and a service chamber which is usually engaged under normal driving conditions.

If the vehicle is desired to be stopped or slowed down the service part is used and when the vehicle is fixed the emergency part is used.

In other words, the service chamber functions when the foot brake is actuated and the parking chamber functions when the hand brake of the vehicle is actuated.

The Emergency spring is compressed by means of the air sent to the emergency chamber which is between the emergency diaphragm and the emergency body. This spring is released as soon as the air inside the emergency chamber is discharged and the force required for braking is provided.

Breather holes are present at the emergency body in order to decrease the effect of the air compressed or expanded in the emergency spring section during the up and down movement of the emergency diaphragm of the traditional diaphragm-diaphragm spring brake actuator. Air is discharged to the external environment from the emergency spring section by means of the breather holes, during the down movement of the emergency diaphragm of the diaphragm-diaphragm spring brake actuators. And, air is sucked into the emergency spring section from the external environment by means of the breather holes, during the up movement of the emergency diaphragm. The entry of large particles from the external environment into the emergency spring section is prevented by means of the release bolt plug.

Dust and humidity may enter the emergency spring section by means of the breather holes, during the up motion of the diaphragm. Humidity especially leads to the corrosion of the emergency spring. At the same time, water, dust and mud can enter from such breather holes, and may lead to the untimely damage of the emergency spring, which is used to keep the vehicle parked, due to corrosion. In such a case, the spring brake actuator, which is very important for vehicles, needs to be immediately repaired or changed.

For this reason, in the known state of the art, brake actuator must be mounted such that breathing holes are facing the road, in order to minimize the amount of water, dust and mud entering the emergency spring section and in order to discharge the water and dirt that has entered into the brake actuator, via the breather holes. Otherwise, the water, dirt and humidity that has entered cannot be discharged and this may lead to the corrosion or breakage of the emergency spring. For this reason, in all of the various known mounting types of the brake actuators, it is required that at least four breather holes are drilled with 90° intervals on the emergency body, during production. All these breather holes are closed with plugs and during installation, the breather hole plug of the brake actuator, at the side facing the road must be dismantled. During this procedure, frequently faced problem is that the wrong plug of the breather hole gets dismantled. In such a case, all of the water, dirt that has entered into the emergency spring section from the open breather hole, may not be completely discharged and the emergency spring starts to erode and cannot function properly after being subjected to corrosion. In the same way, it is also possible for the abrasion of the emergency spring to increase if the breather hole plugs that need to be closed are opened due to vibration and environmental conditions.

In the known state of the art, the release bolt plug prevents the entry of foreign matter into the brake actuator from the external environment. The abrasive materials that enter into the brake actuator from the external environment, cause the release bolt plug produced from rubber to erode in time or come off. This situation negatively effects the operation of the emergency spring and leads to the increase of abrasive factors that enter into the spring.

The patent documents WO 2012/164587 A2, CN202100636 U, GB1237641 A are the known state of the art, and are related to an internal ventilation systems of the diaphragm-piston type emergency spring brake actuators. The high pressure and the vacuum pressure that occur inside the emergency spring section in such internal ventilating systems are carried out by a single valve mounted inside the piston pipe plug.

In the U.S. Pat. No. 7,121,191 B1 patent application the internal ventilation system of diaphragm-diaphragm type emergency spring brake actuators are described. The high pressure and the vacuum pressure that occurs inside the emergency spring section, is regulated by means of valve design mounted inside the intermediate shaft flange, sucking air from the service chamber and the passage of the air to the service chamber.

In all of the patent documents WO 2012/164587 A2, CN202100636 U, GB1237641 A and U.S. Pat. No. 7,121, 191 shared in relation to the known state of the art above, as the discharging of the high pressure that occurs inside the emergency spring section, to the service chamber and the balancing of the vacuum pressure that occurs inside the emergency spring section, by means of the air that is sucked from the service chamber is carried out by a single valve system; in order to discharge the high pressurized air from the emergency spring section to the service chamber from the valve, the service chamber should not be filled with pressurized air; in other words force should not be applied to the foot brake. In short, when the vehicle is desired to be moved from the parking position to the driving position, the emergency spring cannot be set without removing the force applied to the foot brake and this is a disadvantage. In our invention however, as the discharging of the pressurized air from the emergency spring section and the balancing of the vacuum pressure inside the emergency spring section by means of the air sucked from the service chamber are carried out with different members; the pressurized air is discharged to the atmosphere via a release bolt plug, independent from the pressure located inside the service chamber. In other words, setting of the emergency spring and ensuring that the emergency chamber is ready for braking is carried out rapidly, being independent of the force applied to the foot brake and independent of the pressure located inside the service chamber.

The means subject to the invention and the operation principle of the system subject to the invention differ from each other.

SUMMARY OF THE INVENTION

The aim of the diaphragm-diaphragm spring brake actuator with internal ventilation subject to the invention is to prevent the abrasion of the emergency spring and untimely damage thereof by having a design that can completely isolate the emergency spring section of the release bolt plug from the effects of the external environment by eliminating the present breather holes in the emergency body (FIG. 2).

Together with this, the intermediate shaft is fixed to the emergency diaphragm in the invention subject to this application, as opposed to the known state of the art shown in FIG. 2, and the necessity to use a return spring for retracting the intermediate shaft is eliminated. The intermediate shaft has been designed such that it can be fixed to the emergency diaphragm by engaging to each other, without using a chemical or a screw, and by this means chemical usage is eliminated and the invention therefore is environment friendly.

By means of the diaphragm-diaphragm spring brake actuator with internal ventilation, the entry of factors such as dust, dirt, mud, stone and humidity etc. into the emergency spring section, that might affect the operation of the spring brake, is prevented and the corrosion of the emergency spring is also prevented. Thus, preventing the emergency spring from breaking due to abrasion and losing its functionality.

BRIEF DESCRIPTION OF THE DRAWINGS

The figures that have been prepared in order to further explain the diaphragm-diaphragm spring brake actuator with internal ventilation developed according to the present invention illustrates the following.

Figure 1:
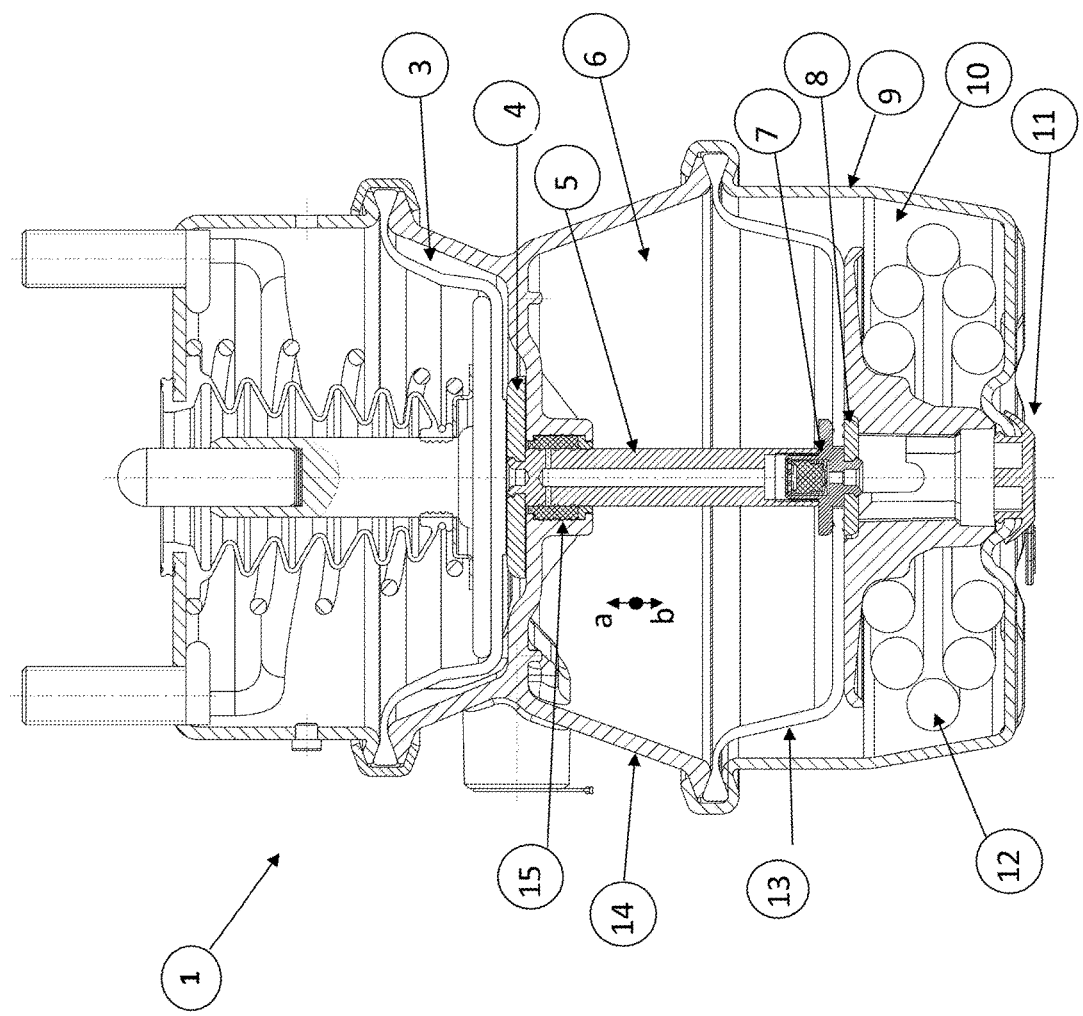
FIG. 1: The sectional view of the diaphragm-diaphragm spring brake actuator with internal ventilation subject to the invention.

The aspects, sections, parts shown in the figures drawn in order to further explain the diaphragm-diaphragm spring brake actuator with internal ventilation subject to the invention have each been numbered and the references of these numbers have been listed below.

1. A diaphragm-diaphragm spring brake actuator with internal ventilation
2. A diaphragm-diaphragm spring brake actuator known in the state of the art
3. Service chamber
4. Intermediate shaft flange
5. Intermediate shaft
6. Emergency chamber
7. Valve system
8. Clamp flange
9. Emergency body
10. Emergency spring section
11. Release bolt plug
12. Emergency spring
13. Emergency diaphragm
14. Adapter plate
15. Rubber bearing member
16. Emergency return spring
17. Release bolt plug lip
18. Air inlet channels
19. Rubber bearing member sealing rings.
20. Intermediate shaft channel
21. Intermediate shaft valve housing
22. Valve cap
23. Valve air inlet holes
24. Valve
25. Valve spring
26. Valve body
27. Valve air outlet hole
28. Emergency body breather holes

DETAILED DESCRIPTION OF THE INVENTION

Figure 2:
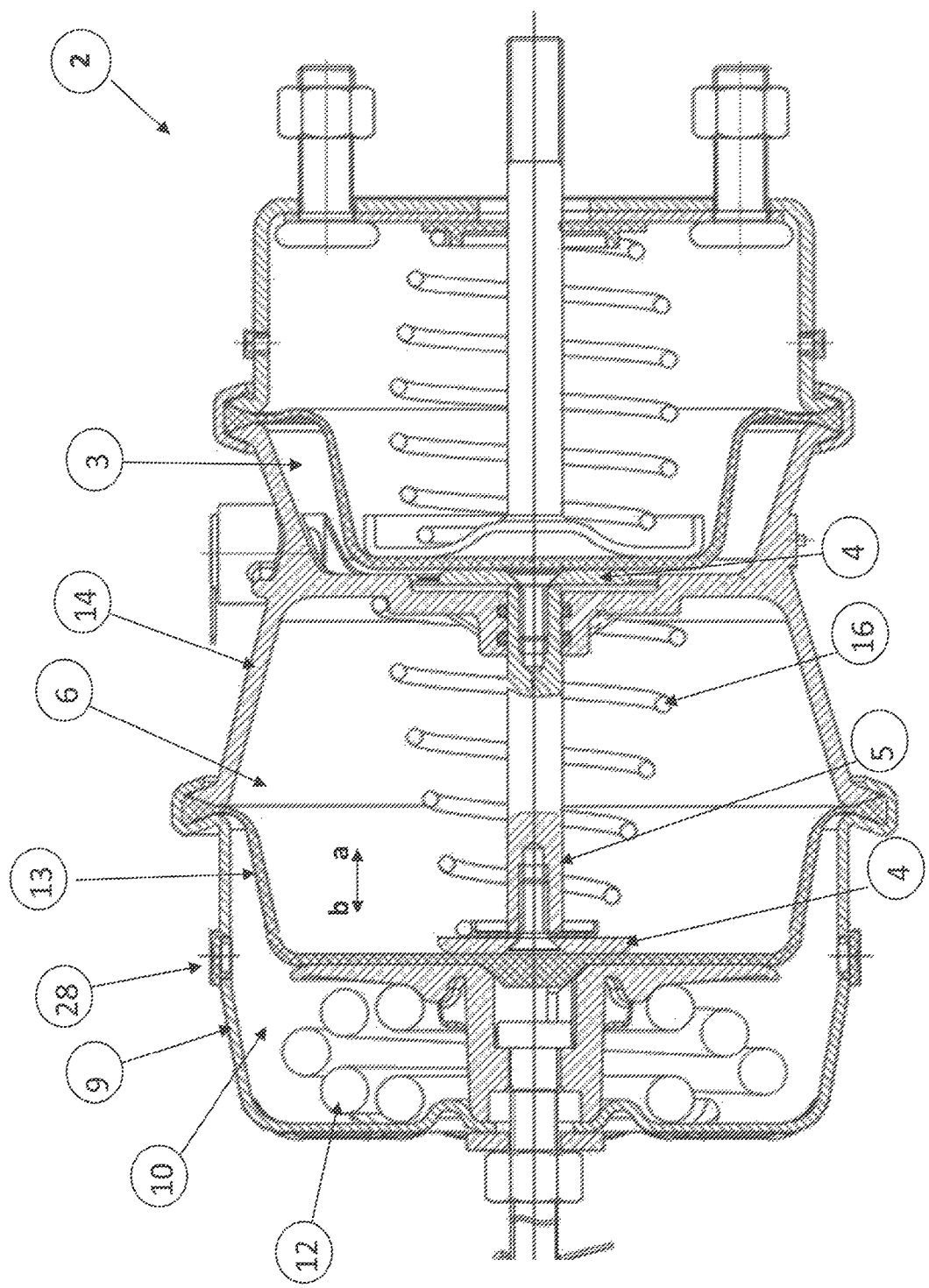
FIG. 2: Cross section of the diaphragm-diaphragm spring brake actuator. (Prior art)

The diaphragm-diaphragm spring brake actuator with internal ventilation of the known state of the art is shown in FIG. 2.

The dust and humidity are carried by means of the breather holes (28) to the emergency spring section (10) during the upwards movement (a) of the emergency diaphragm in the known state of the art. Especially humidity causes the abrasion of the emergency spring (12). Water, dust and mud enters into the emergency spring section (10) from the breather holes (28) and the emergency spring (12), which is responsible to keep the vehicle parked, gets rusted, and the emergency spring is damaged untimely. In such a case the spring brake actuator (2), that is of great importance to vehicles, need to be immediately repaired or changed. Similarly, the abrasion of the emergency spring (12) increases when the plugs of the breather holes (28) are dislocated, which need to be closed due to environmental conditions and vibration (FIG. 2).

In the known state of the art, the release bolt plug (11) prevents the entry of foreign matter into the spring brake actuator (2) from an external environment. The abrasive materials that enter into the spring brake actuator (2) from the external environment, cause the release bolt plug produced from rubber, to erode in time or come off. This situation negatively effects the operation of the emergency spring (12) and leads to the increase of abrasive effects of the abrasive materials that enter into the spring.

The diaphragm-diaphragm spring brake actuator with internal ventilation, subject to the invention, has been designed to balance the extra pressure and the vacuum pressure occurring at the emergency spring section (10) during the operation of the spring brake (1) (FIG. 1).

The valve system (7) responsible for balancing the vacuum pressure formed inside the spring brake actuator with internal ventilation subject to the invention, is integrated into the intermediate shaft (5).

Figure 4:
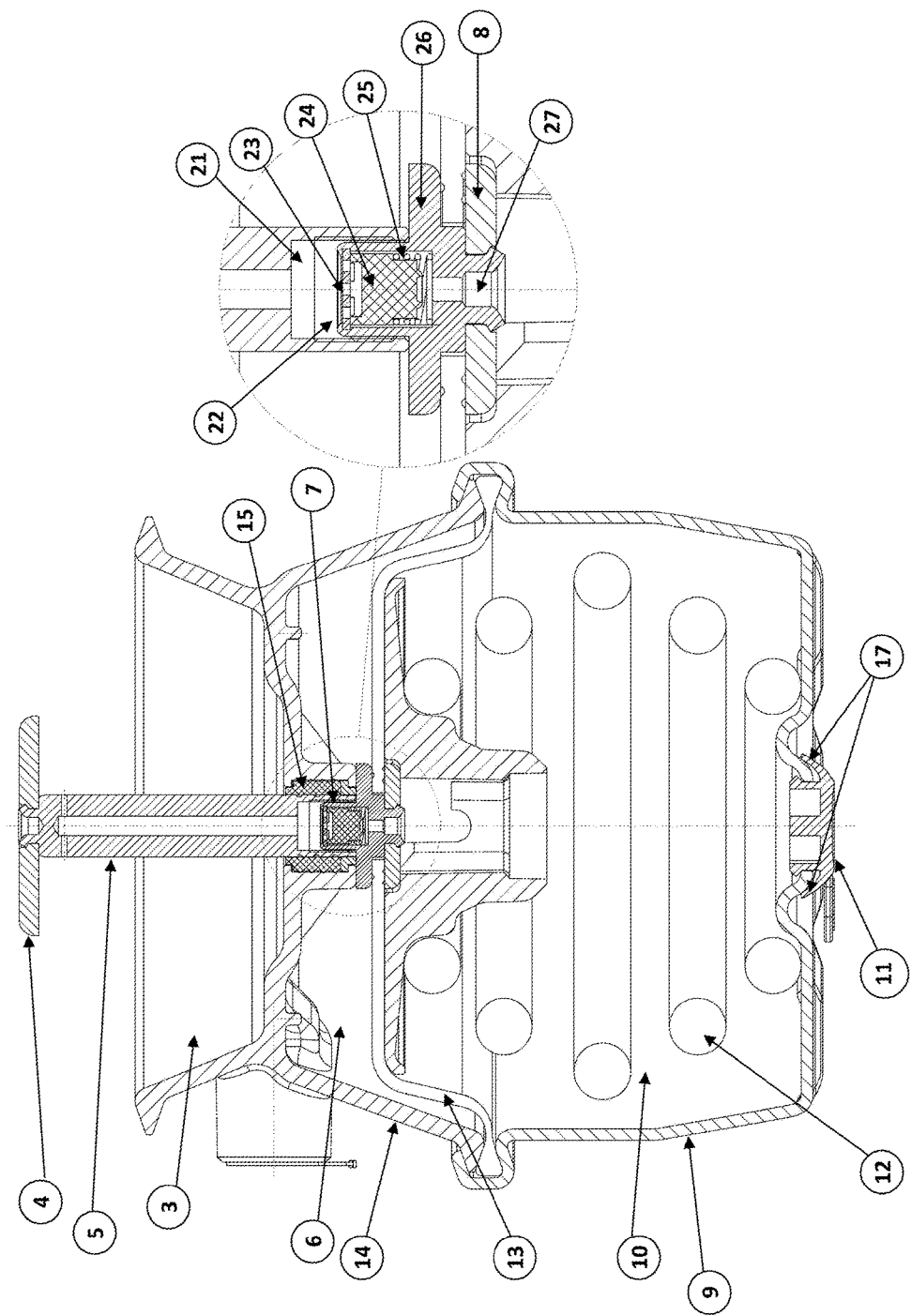
FIG. 4: The sectional view where a force is not applied to the foot brake; however force is applied to the hand brake of the diaphragm-diaphragm spring brake actuator with internal ventilation subject to the invention.

The valve system (7) (a) balances the vacuum pressure formed inside the emergency spring (10), when the emergency spring section reaches maximum volume after the emergency diaphragm (13) moves up when a force is applied to the hand brake and a force is not applied to the foot brake, by sucking the air from the service chamber (3) by means of the channels (18) that lead to the service chamber (3) (FIG. 4).

Figure 3:
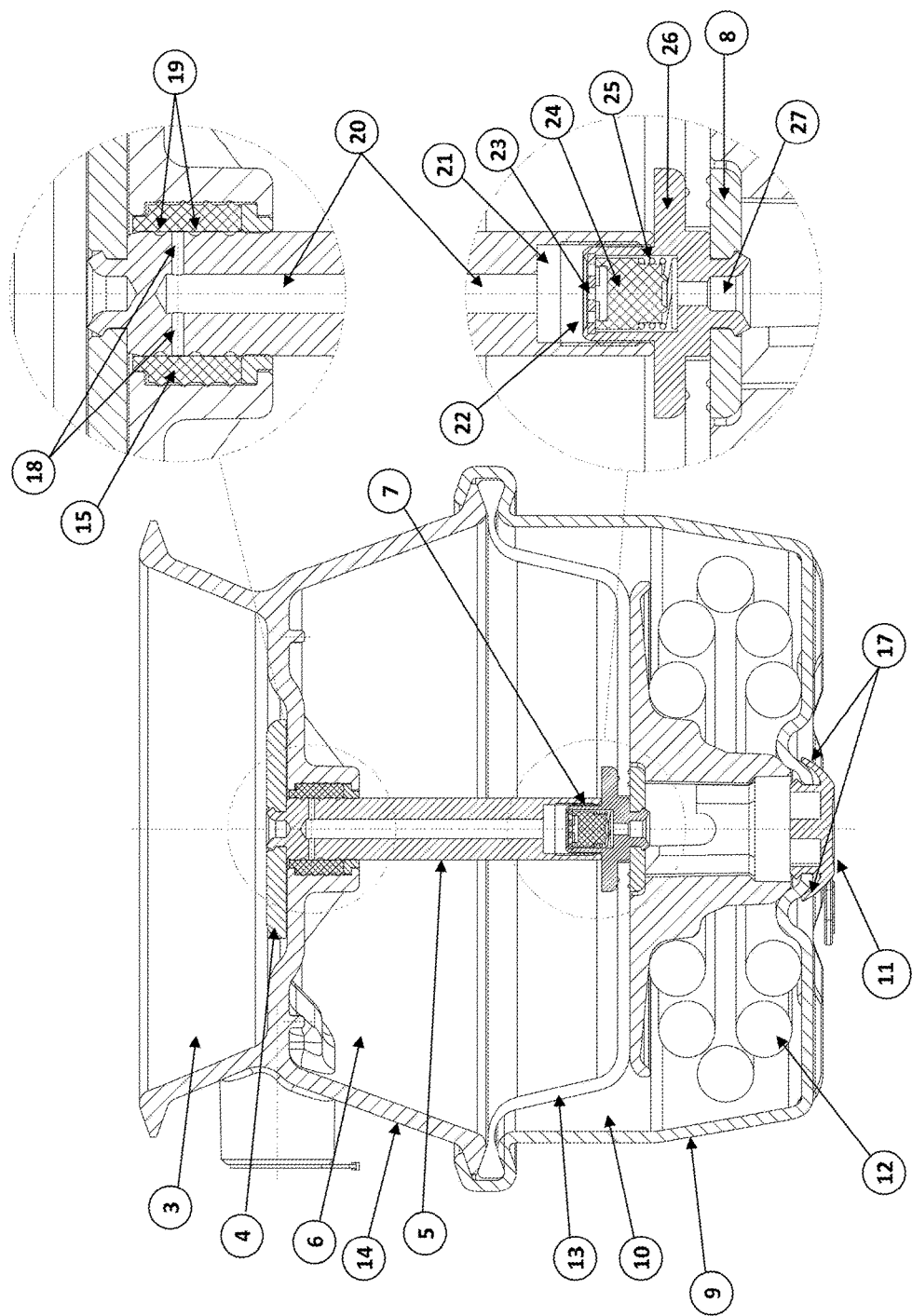
FIG. 3: The sectional view where a force is not applied to the hand brake, of the diaphragm-diaphragm spring brake actuator with internal ventilation subject to the invention.

The release bolt plug (11), is designed to discharge the excess pressure formed inside the emergency spring section (10) when the emergency spring (12) is forced to set, when the force applied to the hand brake is released and the emergency chamber (6) fills up with pressurized air, to the atmosphere (FIG. 3).

When the diaphragm (13) moves downwards, the emergency spring (12) is squeezed and high pressure is formed at the emergency spring section (10). The high pressure air formed, is discharged by means of the release bolt plug lip (17) designed to allow the passage of air to the atmosphere only from the emergency spring section (10). The release bolt plug lip (17), by its design, prevent the entry of the abrasive factors such as air, dust, humidity and mud and water into the emergency spring section (10) from the external environment (FIG. 3).

The air inlet channels (18) are positioned between the two sealing rings of the rubber bearing member (15) when a force is not applied to the hand brake, however the emergency spring (12) is set and the intermediate shaft (5) is positioned at the lowest position. In this situation, by providing impermeability when there is pressurized air inside the service chamber (3) or even when there is no pressurized air inside the service chamber, air passage from the service chamber (3) to the emergency spring section (10) is prevented, and the increase of air consumption and the extension of the reaction time of the service brake is prevented (FIG. 3).

Figure 5:
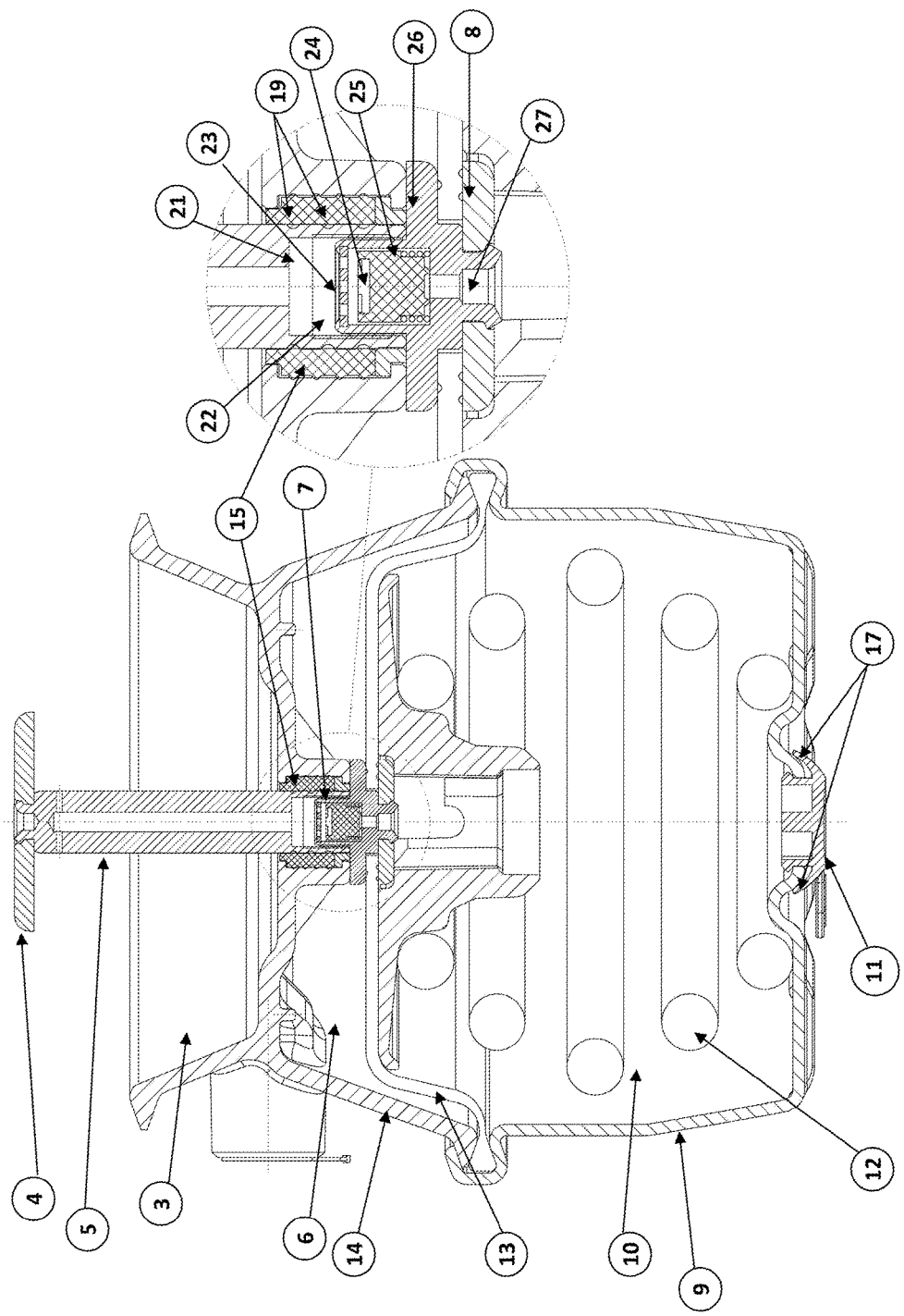
FIG. 5: The sectional view where a force is applied to both the hand brake and the foot brake of the diaphragm-diaphragm spring brake actuator with internal ventilation subject to the invention.

When force is applied to the foot brake, air pressure is formed in the service chamber (3). When air pressure is present in the service chamber (3), and a force is applied to the hand brake, and the emergency brake is actuated, the air inlet channels (18) inside the intermediate shaft (5) will break loose from the position between the two sealing rings (19) of the rubber bearing member (15) and will move to the service chamber (3). In this situation, the valve (7) closes due to the high pressure in the service chamber (3) and the air passage from the service chamber (3) to the emergency spring section (10) is prevented. By this means, when force is applied to the foot brake, and the emergency brake is actuated, the air consumption in the service chamber (3) due to the air flow from the service chamber (3) to the emergency spring section (10), and the extension of the reaction time of the service brake is prevented. Moreover, in this case, the closing of the valve (7) and thereby the passage of the high pressure to the emergency spring section (10) is prevented which also prevents the increase of the setting pressure of the emergency spring (12) (FIG. 5).

When force is applied to the foot brake, and the emergency brake is actuated, and when the air inlet channels (18) inside the intermediate shaft are in an open position to the service chamber (3), if the force applied to the foot brake, is lifted, the pressure inside the service chamber (3) decreases to the pressure level of the atmosphere and the valve opens and the valve system (7) balances the vacuum pressure created at the emergency spring section (10) by means of the air it sucks out from the service chamber (FIG. 4).

According to said invention, the valve body (26) is coupled to the diaphragm (13) by means of a clamp flange (8). By means of this coupling, the intermediate shaft (5) which is coupled to the diaphragm (13) via the valve body, is moved together with the diaphragm (13) and the necessity to use the emergency return spring (16) is eliminated which is usually used to retract the intermediate shaft (5) used in diaphragm-diaphragm spring brake actuators (2) of the known state of the art.

The entry of factors like dust, dirt, soil, stone and humidity, which affect the operation of actuator, into the emergency spring section (10) is prevented by means of the diaphragm-diaphragm spring brake actuator with the internal ventilating system (1) subject to the invention; the rusting of the emergency spring (12), and the breaking of the emergency spring (12), thereby losing its functionality is also prevented.

Within the scope of these basic concepts, it is possible to develop various applications of the diaphragm-diaphragm spring brake actuator with internal ventilation and the invention cannot be limited with the examples described herein and is actually as described in the claims.

The invention comprises;
An intermediate shaft (5) comprising air inlet channels (18), intermediate shaft channel (20), and intermediate shaft valve housing (21),
A valve system (7) comprising a valve cap (22), valve air inlet slits (23), valve (24), and valve spring (25),
A release bolt plug (11) comprising release bolt plug lip (17),
A Clamp flange (8), and
A rubber bearing member (15) comprising rubber bearing member sealing rings (19). The invention comprises a valve system (7) that allows the passage of air from the service chamber to the emergency spring section if a force is not applied to the foot brake and the pressurized air inside the emergency chamber is discharged, and a valve system (7) that cuts off the air flow, by closing by means of the pressure in the service chamber when a force is applied at the same time to both the hand brake and the foot brake. The valve body (26) and the intermediate shaft (5) are coupled to the diaphragm (13) by connection which is not disassembly by means of a clamp flange (8). An impermeability section preventing the air flow between service chamber and emergency chamber by positioning of the air inlet holes (23) between the two sealing rings (19) of the rubber bearing member (15), where the emergency spring is (12) set. It also comprises a release bolt plug (11) which comprises release bolt plug lip that prevent the air flow into the emergency spring section (10) from the atmosphere, and which discharges the high pressure air to the atmosphere, that could occur at the emergency spring section (10), during the setting of the emergency spring.

The invention claimed is:

1. A diaphragm-diaphragm type spring brake actuator with internal ventilation used in an air brake system of heavy vehicles, comprising:
    an intermediate shaft comprising a plurality of air inlet channels, an intermediate shaft channel, and an intermediate shaft valve housing;
    a valve system balancing a vacuum pressure formed inside an emergency spring section by sucking the air from a service chamber by means of the plurality of air inlet channels that connect the emergency spring section to the service chamber; comprising a valve cap, a plurality of valve air inlet slits, a valve, and a valve spring;
    a release bolt plug comprising a release bolt plug lip, wherein the release bolt plug has a substantially flat surface and the release bolt plug lip extend out of the substantially flat surface at an angle towards an outer surface of an emergency body covering a part of the outer surface of the emergency body, wherein the releasable bolt plug prevents an air flow into the emergency spring section from the atmosphere and discharges high pressure air to the atmosphere, that could occur in the emergency spring section during the setting of an emergency spring;

a clamp flange connecting a valve body and the intermediate shaft to a diaphragm by connection which is not disassemblable;

a rubber bearing member comprising a plurality of rubber bearing member sealing rings where the plurality of air inlet channels are positioned between two of the plurality of rubber bearing member sealing rings when the emergency spring is set.

2. The diaphragm-diaphragm type spring brake actuator with internal ventilation according to claim 1, wherein, an emergency return spring-that enables a retraction of the intermediate shaft is not used.

3. The diaphragm-diaphragm type spring brake actuator with internal ventilation according to claim 1, not comprising emergency body ventilation holes on the emergency body.

4. A diaphragm-diaphragm type spring brake actuator with internal ventilation used in an air brake system of heavy vehicles, consisting of:

an intermediate shaft comprising a plurality of air inlet channels, an intermediate shaft channel, and an intermediate shaft valve housing;

a valve system balancing a vacuum pressure formed inside an emergency spring section by sucking the air from a service chamber by means of the plurality of air inlet channels that connect the emergency spring section to the service chamber; comprising a valve cap, a plurality of valve air inlet slits, a valve, and a valve spring;

a release bolt plug comprising a release bolt plug lip, wherein the release bolt plug has a substantially flat surface and the release bolt plug lip extend out of the substantially flat surface at an angle towards an outer surface of an emergency body covering a part of the outer surface of the emergency body, wherein the releasable bolt plug prevents an air flow into the emergency spring section from the atmosphere and discharges high pressure air to the atmosphere, that could occur in the emergency spring section during the setting of an emergency spring;

a clamp flange connecting a valve body and the intermediate shaft to a diaphragm by connection which is not disassemblable;

a rubber bearing member comprising a plurality of rubber bearing member sealing rings where the plurality of air inlet channels are positioned between two of the plurality of rubber bearing member sealing rings when the emergency spring is set.

* * * * *